US011026365B2

(12) United States Patent
Krampe et al.

(10) Patent No.: US 11,026,365 B2
(45) Date of Patent: Jun. 8, 2021

(54) DISTRIBUTOR DEVICE FOR SOLIDS CONTAINING LIQUIDS

(71) Applicant: VOGELSANG GMBH & CO. KG, Essen (DE)

(72) Inventors: Paul Krampe, Oldenburg (DE); Birgit Brinkmann, Lindern (DE); Lars Mester, Menslage (DE); Daniel Behn, Bakum (DE)

(73) Assignee: VOGELSANG GMBH & CO. KG, Essen (DE)

( * ) Notice: Subject to any disclaimer, the term of this patent is extended or adjusted under 35 U.S.C. 154(b) by 195 days.

(21) Appl. No.: 16/058,234

(22) Filed: Aug. 8, 2018

(65) Prior Publication Data

US 2019/0046991 A1  Feb. 14, 2019

(30) Foreign Application Priority Data

Aug. 9, 2017  (DE) .......................... 202017104786.5

(51) Int. Cl.
*A01C 23/00* (2006.01)
*B02C 18/08* (2006.01)
(Continued)

(52) U.S. Cl.
CPC ............ *A01C 23/002* (2013.01); *B02C 18/08* (2013.01); *B02C 18/2216* (2013.01); *B02C 23/26* (2013.01)

(58) Field of Classification Search
CPC ..... B02C 18/08; B02C 18/2216; B02C 23/26; A01C 23/002; A01C 23/001; A01C 23/00;
(Continued)

(56) References Cited

U.S. PATENT DOCUMENTS 3,528,462 A    9/1970  Quase
4,176,686 A  * 12/1979  Stable ...................... F16K 1/34
                                                                    137/216

(Continued)

FOREIGN PATENT DOCUMENTS

DE         8900672      6/1989
DE      102010032852    2/2012
(Continued)

OTHER PUBLICATIONS

Machine Translation of EP 0079018 (Year: 1983).*

*Primary Examiner* — Shelley M Self
*Assistant Examiner* — Teresa A Guthrie
(74) *Attorney, Agent, or Firm* — Price Heneveld LLP

(57) ABSTRACT

A distributor device for solids-laden fluids comprises a distributor housing having a housing underside and a housing topside opposite the housing underside which define an interior space that is subdivided into a fluid space into which the inlet port opens and a ventilation space separate therefrom into which the ventilation port opens. A plurality of outlet ports, an inlet port in the distributor housing, a ventilation port disposed in the housing topside of the distributor housing, and a distributor unit are also included. The distributor unit is movable relative to the distributor housing and disposed inside the distributor housing, and connects each of the outlet ports in fluid communication with the fluid space and with the ventilation space in alternating succession. Relative movement of the distributor unit connects an outlet port of the plurality of outlet ports alternately with the fluid space and the ventilation space.

16 Claims, 5 Drawing Sheets

(51) Int. Cl.
*B02C 18/22* (2006.01)
*B02C 23/26* (2006.01)

(58) Field of Classification Search
CPC ... A01C 23/007; A01C 23/003; A01C 23/006; B65G 53/4608
USPC .............. 241/46.06; 222/410, 482, 484–486; 239/428.5
See application file for complete search history.

(56) References Cited

U.S. PATENT DOCUMENTS

| | | | |
|---|---|---|---|
| 6,311,716 B1 | 11/2001 | Jones | |
| 7,523,512 B1 | 4/2009 | Delaney | |
| 7,540,304 B2 * | 6/2009 | Cornwell | F16K 15/021 |
| | | | 137/860 |
| 2002/0174886 A1 | 11/2002 | Paper | |
| 2015/0076261 A1 * | 3/2015 | Hertwig | B02C 18/06 |
| | | | 241/46.04 |

FOREIGN PATENT DOCUMENTS

| | | | |
|---|---|---|---|
| DE | 202012003064 | 7/2012 | |
| DE | 202017101065 | 3/2015 | |
| DE | 202014003274 | 7/2015 | |
| DE | 102015106371 | 10/2015 | |
| DE | 202015103442 | 10/2016 | |
| DE | 202016103149 | 1/2017 | |
| DE | 202016102246 | 7/2017 | |
| DE | 202016103149 | 7/2017 | |
| DE | 202016105218 | 12/2017 | |
| DE | 202016106367 | 3/2018 | |
| DE | 202017101065 | 5/2018 | |
| EP | 0079018 | 5/1983 | |
| EP | 0079018 A1 * | 5/1983 | ........... A01C 23/002 |
| EP | 1010362 | 6/2000 | |
| EP | 1010362 A1 * | 6/2000 | ........... A01C 23/003 |
| EP | 2850928 | 3/2015 | |
| EP | 3133219 | 2/2017 | |
| EP | 3175696 | 6/2017 | |
| EP | 3375943 | 9/2018 | |
| HK | 1215421 | 8/2016 | |
| WO | 2012012867 | 2/2012 | |
| WO | 2017086858 | 11/2017 | |

\* cited by examiner

DISTRIBUTOR DEVICE FOR SOLIDS CONTAINING LIQUIDS

CROSS-REFERENCE TO FOREIGN PRIORITY APPLICATION

The present application claims the benefit under 35 U.S.C. §§ 119(b), 119(e), 120, or 365(c) of DE 202017104786.5 file Aug. 9, 2017.

FIELD OF THE INVENTION

The invention relates to a distributor device for solids-laden fluids, comprising a distributor housing, which has a housing underside and a housing topside opposite the housing underside and which encloses an interior space, a plurality of outlet ports, an inlet port in the distributor housing, a ventilation port in the distributor housing, a distributor unit which is movable relative to the distributor housing and arranged inside the distributor housing, and which divides the interior space into a fluid space into which the inlet port opens and a ventilation space into which the ventilation port opens, wherein the relative movement of the distributor unit connects an outlet port of the plurality of outlet ports alternately with the fluid space and the ventilation space. Distributor devices of this type are used to distribute a solids-laden fluid from a supply line into a plurality of discharge lines.

BACKGROUND OF THE INVENTION

One typical field of application for such distributor devices is in agricultural engineering, where the aim in many applications is to distribute fluids carrying fibre content from one pipeline among several pipelines, for example to spread liquid manure as a reservoir of nutrients via a dribble bar onto a field.

One fundamental problem that arises with the distribution of such solids-laden fluids is blockage and non-uniform distribution of the fluid. Due to blockages, one of the plurality of output lines on which the fluid is to be distributed no longer contains any fluid, with the result that no fluid is distributed to a particular area. Non-uniform distribution means that all the output lines contain fluid, but in different amounts, which means with different flow rates. This can be caused by various factors, for example, partial blockages, flow effects, local pressure drag effects, such as local overpressure at the output of the output line, or local underpressure at the input of the output line and other effects.

One known way of reducing the risk of blockages by the solids-laden fluid is to provide, inside such a distributor device, a distributor unit that can be moved relative to the distributor housing. More specifically, such distributor unit can be moved relative to the outlet ports arranged on the distributor housing. Such a distributor unit is used to connect an outlet port, and optionally each of the plurality of outlet ports, alternately in a particular sequence to a fluid space and to a ventilation space inside the distributor housing. As a result, the outlet port or each of the outlet ports is not permanently and exclusively in fluid communication with the fluid space and therefore with the inlet port. Instead, the connection is repeatedly either interrupted and replaced by a connection to the ventilation space, or it is supplemented in such a way that a pulsating flow of the fluid is applied to the outlet port. The advantage of this pulsating flow is that blockages cannot arise, or can be released if they do arise. In the simplest case, such a distributor unit can be provided, for example, by a rotary disc valve arrangement that closes and opens the outlet ports alternately and in which there is a connection to a ventilation space when the valve is closed.

In many cases, distributor devices for solids-laden fluids are also fitted with a comminution/maceration device for comminuting/macerating larger solids in the fluid and by that means further reducing the risk of a blockage or non-uniform distribution. Such a comminution/maceration device can be realised in a cutting or shredding unit arranged in the region of the inlet port, or connected if necessary upstream from the inlet port, or which is disposed inside the distributor housing.

Distributor devices in which a distributor unit providing a distribution function and a comminution/maceration function is arranged in the distributor housing are known from the prior art, for example the "Dosimat LVX" precision distributor sold by the present applicant. In such devices, a two- or three-winged rotor (which could also be a four-winged or x-winged rotor) rotates inside the distributor housing and on its rotor wings has cutting edges that sweep over the outlet ports arranged in the lower housing side of the distributor device, thus performing a comminution/maceration function. At the same time, the interior space of the rotor is filled with the fluid to be distributed, so fluid is therefore applied to those outlet ports which are covered by the rotor wings, whereas outlet ports which are not covered by rotor wings are connected to a ventilation space provided outside the rotor. This results in a pulsating flow of fluid and air being applied to each of the outlet ports, the frequency of the pulsation being double or triple the rotor speed, depending on the number of rotor wings (see above). Since an outlet port is briefly connected to both those spaces at each transition from the space loaded with fluid to the ventilation space, and therefore connects the two to each other, it is possible in this distributor for fluid to accumulate in the ventilation space, in particular, when the fluid is fed under pressure to the distributor and a high counterpressure is produced in individual outlet ports, for example by a blockage. The rotation of the rotor can cause turbulence of the fluid or formation of foam in the ventilation space, with the risk that fluid or foam then escapes to the surroundings through the ventilation ports in the distributor housing.

A distributor device which likewise provides both a distribution function and a comminution/maceration function is known from EP 2 850 928 A1. This is achieved by an eccentrically moved cutting edge provided in the form of a cup point and with counter blades provided in the form of outlet ports which are connected directly to the output lines of the distributor device. Due to being guided on an eccentric path, the annular cutting blade sweeps over said outlet ports and connects the outlet ports selectively with an interior space defined by the annular cutting edge or to an exterior space located outside said annular cutting edge. The exterior space is connected to the feed line for the fluid and is therefore a fluid space which is successively in fluid communication with the outlet ports to provide a pulsating flow.

The interior space defined by the annular cutting edge is a ventilation space. To prevent uniform distribution being impeded by underpressure in the outlet ports, which would be caused by the speed and mass inertia of the pulsating flow of fluid through the output lines connected to the outlet, said ventilation space is connected to an adjacent ventilation port located radially inwards from the outlet ports. Said ventilation port is thus connected to the ventilation space at each eccentric position of the annular cutting blade and allows more air to be supplied after each pulse of fluid pressure in the output lines.

In normal operation of the distributor device, such an arrangement basically distributes the solids-laden fluid substantially uniformly to all the outlet ports and is able to prevent blockages from occurring. Turbulence and foam formation are also reduced, due to the eccentrically guided rotor having less mechanical motion compared to rotating wings. Even this distributor device can be further improved, however. The inventors have observed that the precision of distribution is adversely affected under particular operating conditions when a very inhomogeneous fluid, which alternately has a very thin consistency followed in sequence by a very viscous consistency, is distributed by the distributor device, or when alternating flow resistances occur on the output side. Improvements to such distributor devices is desired.

SUMMARY OF THE INVENTION

The object of the invention is to provide a distributor device which provides precise and uniform distribution of the fluid to the outlet ports even when inhomogeneous fluids are periodically fed. This object is achieved, according to the invention, by a distributor device of the kind initially described, in which the ventilation port is arranged in the housing topside.

According to the invention, the ventilation port is arranged in the housing topside. Unlike previously known embodiments in which the ventilation port is arranged adjacent to the outlet ports due to the direct supply of air provided there, and for that reason is arranged either in the side wall of the distributor housing or in the underside of the distributor housing, due to the need to connect hoses, the ventilation port according to the invention is arranged in a housing side which is on top when in the mounted position. This position has various advantages. Firstly, the force of gravity prevents fluid from escaping unpressurised from the interior space through the ventilation port. In this arrangement, it is possible for the ventilation ports and the outlet ports to not be directly adjacent to each other, due to the arrangement of the ventilation port according to the invention, which is advantageous because it also reduces the risk of the ventilation port being contaminated and provides good accessibility to the ventilation port for cleaning it, so the risk of the ventilation port being clogged, or a valve inserted into the ventilation port being unable to function properly due to contamination, is reduced. Due to the possibility in this arrangement of the ventilation port not being directly adjacent to the outlet port, the course and the length of the flow path between the ventilation port and each of the outlet ports is equalised, in contrast to the prior art, where some outlet ports have a very short flow path to the ventilation port, whereas others have a very long flow path in relation, which can result in different flow characteristics in the output lines connected to that outlet port.

According to a first preferred embodiment, the outlet ports are arranged in or adjacent to the housing underside. Arranging the outlet ports in the housing underside or adjacent thereto results in a particularly streamlined arrangement not only with regard to the guidance of air inside the distributor housing, but also with regard to the guidance of fluid inside the distributor housing. It is possible, for example, for the inlet port to be arranged in the housing topside, thus achieving flow guidance almost in a straight line from the inlet port to the outlet ports. In combination with the ventilation port in the housing topside, in particular, it is then possible for air and fluid to be guided in identical flow path directions within the distributor housing. It is also advantageous that arranging the outlet ports in or adjacent to the housing underside results in the flow paths from the ventilation port to each of the outlet ports being almost identical in length, thus allowing disadvantageous effects caused by different lengths of ventilation path to be completely or largely prevented. According to the invention, the outlet ports in this embodiment are therefore opposite the ventilation port by which the respective outlet ports are ventilated.

It is further preferred that no outlet port is arranged in the housing topside. By doing away with any outlet port in the housing topside, the housing topside may be substantially closed in design, having only the ventilation port and possibly the one or more inlet port(s). This gives the distributor device an improved structure for maintenance and cleaning purposes, firstly. Furthermore, due to the spatial separation of the ventilation port from the outlet ports, it is possible to distribute them favourably for the guidance of air and fluid flow inside the interior space, which in contrast to the prior art allows large cross sections of flow between the inlet port and the outlet ports in the interior space, therefore reducing the risk of blockages in the interior space. Dispensing with an outlet in the housing topside also makes it necessary to arrange the outlet ports in a side wall, in several side walls and/or in the underside of the housing, which results in the advantages described in the foregoing.

Alternatively, it should be understood that the advantages according to the invention can also be achieved in a slightly reduced form if a single outlet port or less than five outlet ports are arranged in the housing topside, but not a plurality of outlet ports.

It is further preferred that the distributor housing comprises a housing base and a housing cover releasably connected to the housing base and that the housing cover includes the housing topside and a housing side wall that extends from the housing topside to the housing underside. According to this development of the invention, the housing topside is spaced apart from the housing underside by a side wall of the distributor housing cover, as a result of which the ventilation port is spaced vertically apart from the housing underside, and any undesired escape through the ventilation port of fluid or foam that has formed is suppressed by the force of gravity. The ventilation port is preferably in the region of a housing dome which is shaped vertically upwardly and is formed by the housing side wall and die housing topside. It should be understood, in particular, that the housing underside is formed at the housing base, thus making the outlet ports easily accessible when the housing cover is opened.

According to another preferred embodiment, the ventilation port is sealed by a non-return valve which is designed to stop fluid escaping from the ventilation space through the ventilation port and to allow air to flow into the ventilation space through the ventilation port. By sealing the ventilation port with such a non-return valve, air can flow through the ventilation port from outside the distributor housing into the ventilation space, but it is not possible for flow to occur from the ventilation space outwards into the surroundings of the distributor housing through the ventilation port. This prevents solids-laden fluids from escaping through the ventilation port to the outside in the event of malfunctions or overloading of the distributor device. The non-return valve can be an elastically biased non-return valve, in particular, the closing function of which is supported by biasing it elastically into the closed position. The non-return valve can also be pressed into the closed position by the action of other forces, for example by the force of gravity, or it can be designed as a particularly smoothly operating non-return valve such that it is moved into the open position or into the closed position solely under the influence of flow or pressure.

It is particularly preferred in this regard that the non-return valve is provided in the form of a sealing diaphragm which is elastically biased to a closed position in which the escape of fluid from the ventilation space through the ventilation port is blocked, and which can be moved by a relative underpressure in the ventilation space relative to the ventilation port into an open position in which the inflow of air through the ventilation port into the ventilation space is allowed. A sealing diaphragm should be understood in this context to be a surface element that is biased by internal stress or by separately provided elastic elements, for example a metal spring, into a position in which the ventilation port is closed, so that no fluid can escape from the interior space through the ventilation port to the outside. The diaphragm may be biased in such a way, if necessary, that the diaphragm presses lightly against a valve sealing seat. This contact with little force can be increased in such a way, by exerting compressive force onto the sealing diaphragm, that even when a fluid acts on the ventilation port with increased pressure from the interior space, a reliable seal is still provided by the sealing diaphragm. The sealing diaphragm can basically be designed in such a way, for example, that it is inserted flush into the ventilation port and lies on a frame or structure, thus closing the ventilation port over its entire cross section, the structure being arranged in the direction of airflow from the outside through the inlet port into the ventilation space in front of the sealing diaphragm, such that the sealing diaphragm can rise from the frame or structure under the effect of a flow of air from outside into the ventilation space and open the flow path for the air. The sealing diaphragm can be also designed differently, for example, by contacting an annular sealing surface with its edge and providing the seal in that way.

It is still further preferred that the inlet port opens into an inlet passage which extends from the housing topside into the fluid space. In this embodiment, the inlet port is provided at an inlet passage, thus allowing the solids-laden fluid entering through the inlet port to pass through the inlet passage into the interior space as far as the fluid space inside the distributor housing. In particular, the inlet passage may extend through the ventilation space, thus separating the result ventilation space reliably from the fluid space in the interior space.

It is still further preferred that the ventilation port is formed by an annular passage around an inlet passage into which the inlet port opens. It should be understood, as a basic principle, that the inlet port may be centrally arranged on the housing topside, and that the inlet passage accordingly extends centrally along a middle axis of the distributor device. In certain embodiments, the inlet port may also be arranged decentrally, or a plurality of decentrally arranged inlet ports may be provided. Arranging the ventilation port as an annular passage extending around an inlet passage produces a particularly advantageous configuration of the flow paths for air and fluid in the interior space, which ensures that fluid and air are applied uniformly to all the outlet ports. The annular passage can also be sealed particularly favourably by a matching annular diaphragm, thus making it robust and reliable with regard to the flow of air through it and with regard to preventing fluid from escaping.

It is particularly preferred in this regard that the sealing diaphragm is formed by an elastomeric ring around the inlet passage, in particular, by an elastomeric annular disc. Such an elastomeric ring, or such an elastomeric annular disc, may be sealingly fixed to the outer surface of the inlet passage, for example, and can contact a valve seat with its circular outer edge or with an annular surface portion in the region of its outer edge, and in this way produce the seal. The valve seat can be provided, for example, on the inner surface of the housing topside. This provides a reliable bias and seal against the exit of fluid through the ventilation port to the outside, yet at the same time allows the non-return valve formed by the sealing diaphragm to open smoothly and noiselessly for the inflow of air through the ventilation port into the ventilation space.

It is still further preferred that the ventilation port is arranged in the region of a dome-shaped outward bulge in the housing topside. A dome-shaped outward bulge in the housing topside should be understood here to mean that a region that includes the ventilation port and possibly also the inlet port extends further outwards in relation to the rest of the housing topside, in particular, that it bulges convexly outwards or is step-shaped towards the outside. Such a geometry means that the ventilation port is arranged even higher and as a result is better protected against contamination, and that any backflow of fluid through the ventilation port under the force of gravity is further prevented.

It is still further preferred that the distributor unit includes a sealing member that is movable between a first position, in which it seals at least one of the plurality of outlet ports against the ventilation space, and a second position, in which it provides fluid communication between the at least one of the plurality of outlet ports and the ventilation space. According to this embodiment, a sealing member of the distributor unit moves between a first and a second position in order to connect the outlet ports alternately to the ventilation space and to seal them against the ventilation space. More specifically, in the first position the sealing member seals the outlet ports against the ventilation space and connects them to the fluid space, so that, by means of the sealing member, the ventilation port is connected alternately to the fluid space and to the ventilation space. This results in a desirable pulsating flow of the solids-laden fluid being applied to the outlet ports, and, in particular, allows more air to be drawn from the ventilation space in the phase in which the outlet ports are sealed against the fluid space. The sealing member may basically move periodically, for example, by reciprocal movement or by moving on a circular path, or by moving eccentrically or in some similar way, in order to move the sealing element alternately between the first and the second position.

It is still further preferred that the sealing member of the distributor unit be adapted to connect each of the outlet ports in alternating succession to the fluid space and to the ventilation space. According to this embodiment, each of the outlet ports is connected in alternating succession to the fluid space and to the ventilation space, which can specifically be achieved in the manner previously described with regard to the first and second position of the seal member and recurrent positioning of the sealing member in said first and second position in sequence. Whenever the sealing member connects one or more outlet ports to the fluid space, it can simultaneously seal those one or more outlet ports against the ventilation space and vice versa, namely, seal the outlet port or plurality of outlet ports against the fluid space whenever the sealing member connects one or more outlet ports to the ventilation space. The sealing member can basically be designed in such a way that at any one time it connects some of the outlet ports to the ventilation space and the other outlet ports to the fluid space. The ratio of the number of outlet ports connected to the fluid space to the number of outlet ports connected to the ventilation space can be 1:1, but it is also possible, in particular, for more outlet ports to be connected to the fluid space only rather than to the ventilation space, in order to produce a higher volumetric flow rate of fluid through the distributor device.

The distributor device can be further developed by disposing a comminution/maceration unit in the interior space for comminution/maceration of solids in the solids-laden fluid. Such a comminution/maceration unit in the interior space of the distributor device can comminute/macerate large solids in the fluid and thus reduce the risk of blockages and non-uniform distribution of the fluid. The comminution/maceration device can be provided in the form of moving blades, for example, or as a shredder. Comminution/maceration unit can basically be achieved by severing forces as in cutting, shearing, or tearing.

The comminution/maceration unit can preferably be formed by a first cutting element arranged adjacent to the housing underside and comprising first cutting edges, and by a second cutting element lying on top of the first cutting element, which is movable relative to the first cutting element and has second cutting edges. This produces a shearing and cutting effect which ensures that solids are efficaciously comminuted/macerated in the bottom region of the distributor housing. The first cutting edges can preferably be formed by the edges of openings that are in fluid communication with the outlet ports and in particular are flush with the latter. This embodiment is particularly advantageous in combination with the previously described embodiment with a housing cover comprising a housing side wall and a housing topside, because their interaction results in the cutting edges and outlet ports being particularly easy to access for maintenance purposes when the housing cover is opened, yet at the same time reducing the risk of any undesired escape of fluid through the ventilation port.

It is still further preferred that the distributor unit includes the comminution/maceration unit. This gives the distributor device a compact structure, in that the comminution/maceration unit is included or integral in the distributor unit.

It is particularly preferred in this regard that the relative movement of the distributor unit causes comminution/maceration by the comminution/maceration unit. In this embodiment, the movement of the distributor unit that is necessary to distribute the fluid in a pulsating manner to the outlet ports is used simultaneously to drive the comminution/maceration device and to comminute/macerate the solids. This allows a single drive to be used for the distribution function and the comminution/maceration function. Based on this single drive unit, it is possible to provide a single drive transmission into the housing, in order to obtain a housing design that is robust and well sealed. The movement can be rotational, for example, or eccentric movement.

It is also particularly preferred that the comminution/maceration unit contains a cutting element that is an integral part of the sealing member. In this embodiment, the comminution/maceration device and the sealing member are integral, that is to say, they are provided in the form of a single component or combination of components joined to each other. In particular, the sealing member may be embodied, for example, as a cutting blade that interacts with a counter blade or plurality of counter blades, thus resulting in a shearing effect as the comminution/maceration effect when the sealing member is moved. A counter blade can thus be provided by the edges of the outlet ports, for example, over which an annular cutting blade, for example, is swept, thus producing a shearing effect with a comminution/maceration effect.

BRIEF DESCRIPTION OF THE DRAWINGS

A preferred embodiment shall now be described with reference to the attached Figures, in which:

FIG. 5 is a view according to FIG. 4 with the rotor in a different rotational position and with the flow paths drawn in.

DETAILED DESCRIPTION OF THE PREFERRED EMBODIMENTS

Figure 1:
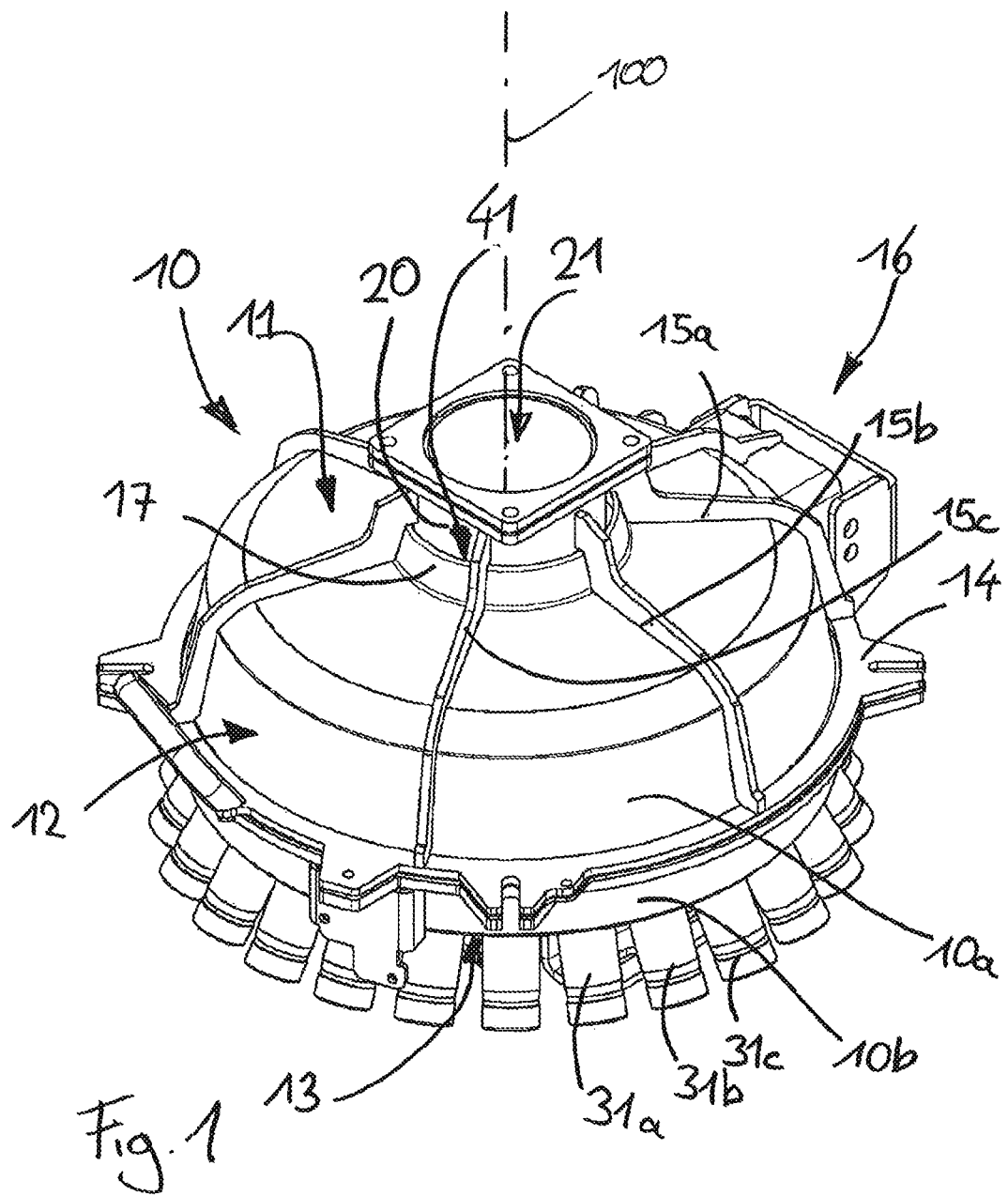
FIG. 1 is a perspective view of a distributor device according to the invention, viewed at an angle from the side and from above.

As referenced in the Figures, the same reference numerals may be used herein to refer to the same parameters and components or their similar modifications and alternatives. For purposes of description herein, the terms "upper," "lower," "right," "left," "rear," "front," "vertical," "horizontal," and derivatives thereof shall relate to the present disclosure as oriented in FIG. 1. However, it is to be understood that the present disclosure may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise. The drawings referenced herein are schematic and associated views thereof are not necessarily drawn to scale.

The distributor device according to the invention has a distributor housing 10 that has a housing topside 11, a housing side wall 12, and a housing underside 13. The housing underside 13 is arranged opposite the housing topside 11. The housing side wall 12 is provided in the form of an approximately cylindrical wall extending slightly conically upwards and connecting the housing topside 11 to the housing underside 13. The distributor housing 10 is basically formed by a housing cover 10a and a housing base 10b. The distributor housing 10 is attached in the region of housing base 10b to a frame, a holder, or the like on a vehicle or trailer, or is attached to a stationary point, such that the housing underside 13 cannot be moved for maintenance purposes, which is also expedient and necessary, since all the hose lines are attached to the housing underside 13.

The housing cover 10a is connected by means of a hinge 16 to the housing base 10b, so that the housing cover 10a can be flipped open for maintenance purposes. Along a circumferential flange region 14, the housing base 10b and the housing cover 10a can be releasably and fluid-tightly connected to each other. This allows easy access to the interior space of the distributor housing 10 for maintenance and cleaning purposes and provides a reliable seal.

The housing topside 11 is integral with the housing side wall 12 at the housing cover 10a. The housing topside 11 is therefore spaced vertically apart from flange area 14 and the housing underside 13.

The housing topside 11 and the housing side wall 12 are reinforced by a plurality of ribs 15a, 15b, 15c, in order to give the housing cover 10a a high level of stiffness. Housing cover 10a can therefore be made of plastic, for example.

The housing cover 10a is shaped like a flattened dome, with the housing side wall 12 forming the vertically extending portions of the dome and housing topside 11 forming the horizontally extending portion of the dome. The housing topside 11 has a central, dome-shaped elevation 17, through which an inlet passage 20 extends in an axial direction in relation to a central longitudinal axis 100. An inlet passage 20 extends from an inlet port 21 located at the topmost point of the distributor device into the interior space of distributor housing 10.

A plurality of outlet ports 30a, 30b, to each of which a respective outlet connection piece 31a, 31b, 31c may be connected, are arranged in housing underside 13. Each outlet connection piece 31a, 31b, 31c extends in a substantially axial direction in relation to the central longitudinal axis 100 and is inclined slightly radially outwards. This allows output hoses to be connected easily and without obstruction to outlet connection pieces 31a, 31b. An annular passage 41, through which air can flow from the surroundings into the distributor housing, is formed between dome-shaped bulge 17 on the housing topside 11 and inlet passage 20. Annular passage 41 serves as a ventilation port.

Figure 4:
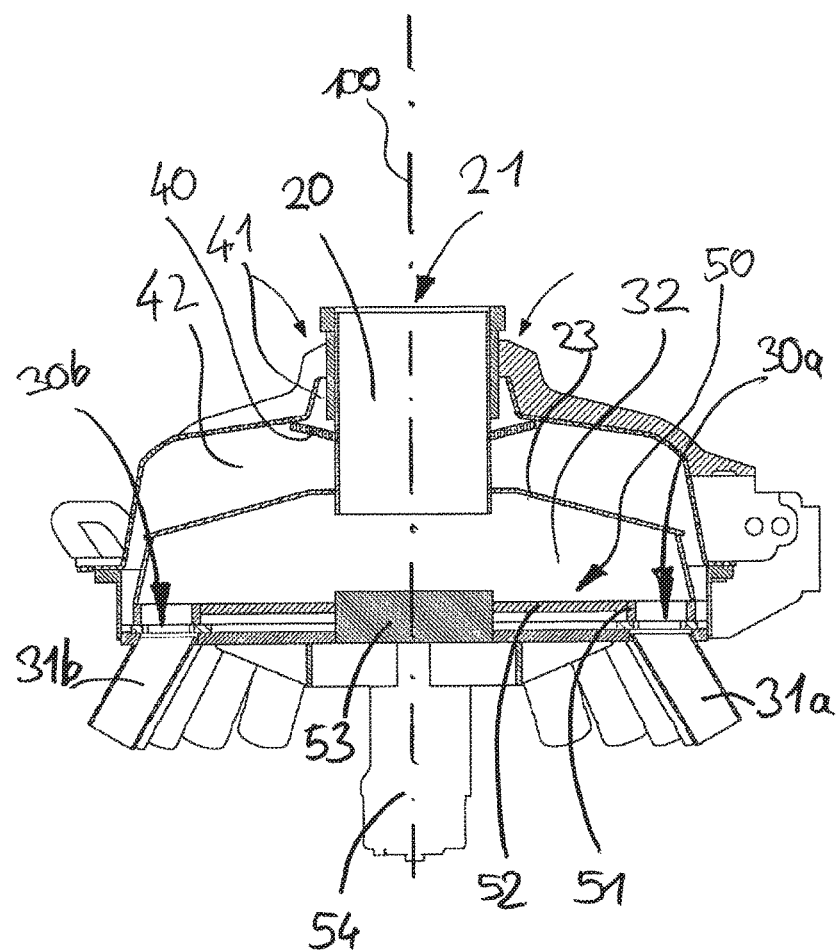
FIG. 4 is a longitudinal cross-sectional side view of the embodiment shown in FIG. 1.

Starting at the inlet opening, inlet passage 20 extends approximately to half the height of the interior space in distributor housing 10. At that height, inlet passage 20 opens into a fluid space 32, which is separated from a ventilation space 42 by a partition wall 23. Ventilation space 42 can be ventilated by air flowing into it through ventilation port 41. A non-return valve formed by a sealing diaphragm 40 in the shape of an annular disc is arranged between annular passage 41, which forms the ventilation port, and ventilation space 42. Sealing diaphragm 40 is attached at an inner circumferential edge to the outer side of inlet passage 20 and sealingly contacts an outer circumferential edge on the inner side of the housing topside 11. In the position shown in FIG. 4, for example, sealing diaphragm 40 is shown in a biased position in which it is in a blocking position to prevent the discharge of fluid out of ventilation space 42 through annular passage 41.

Figure 2:
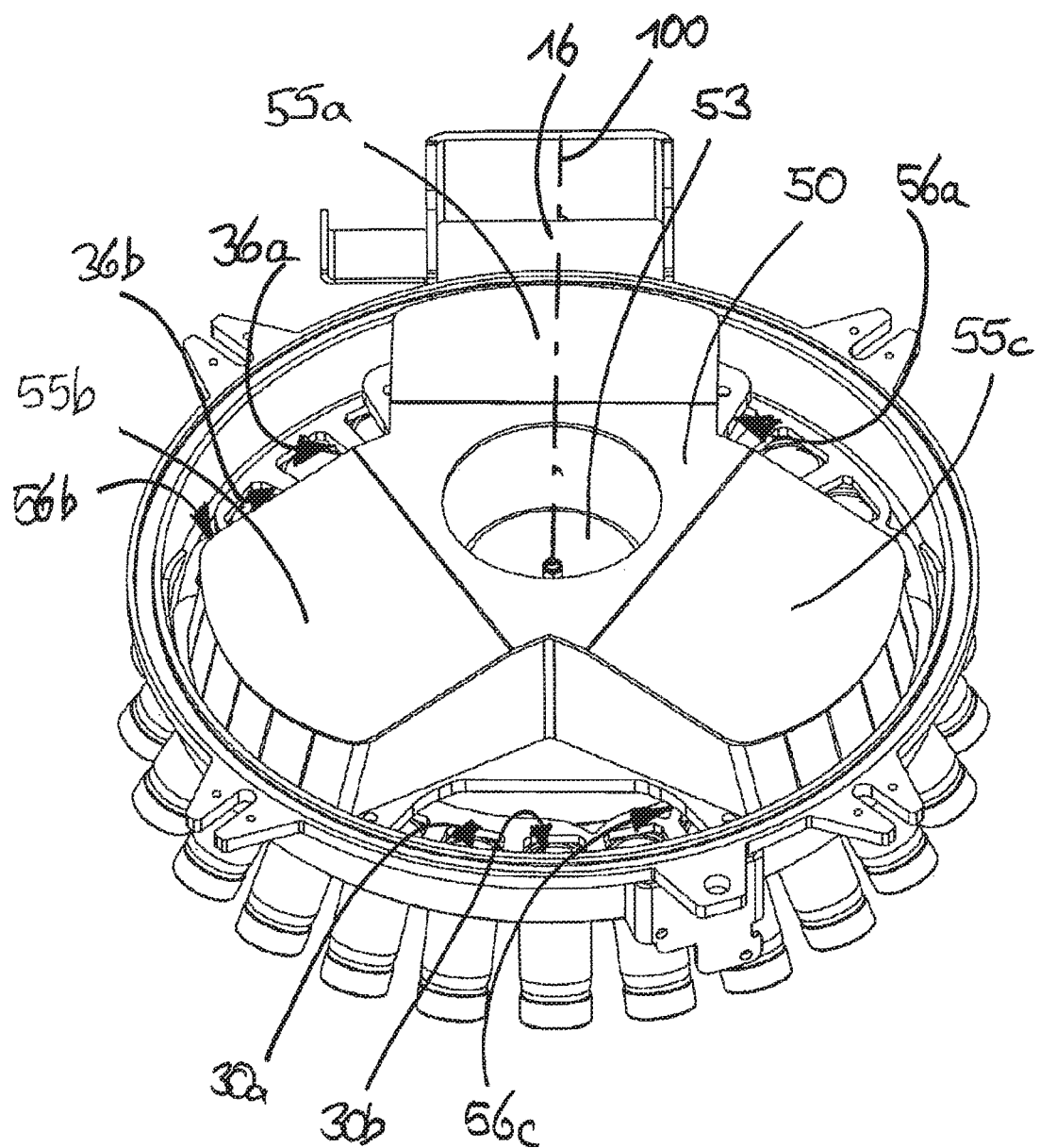
FIG. 2 is a perspective view of the embodiment shown in FIG. 1, with the housing cover removed.
Figure 3:
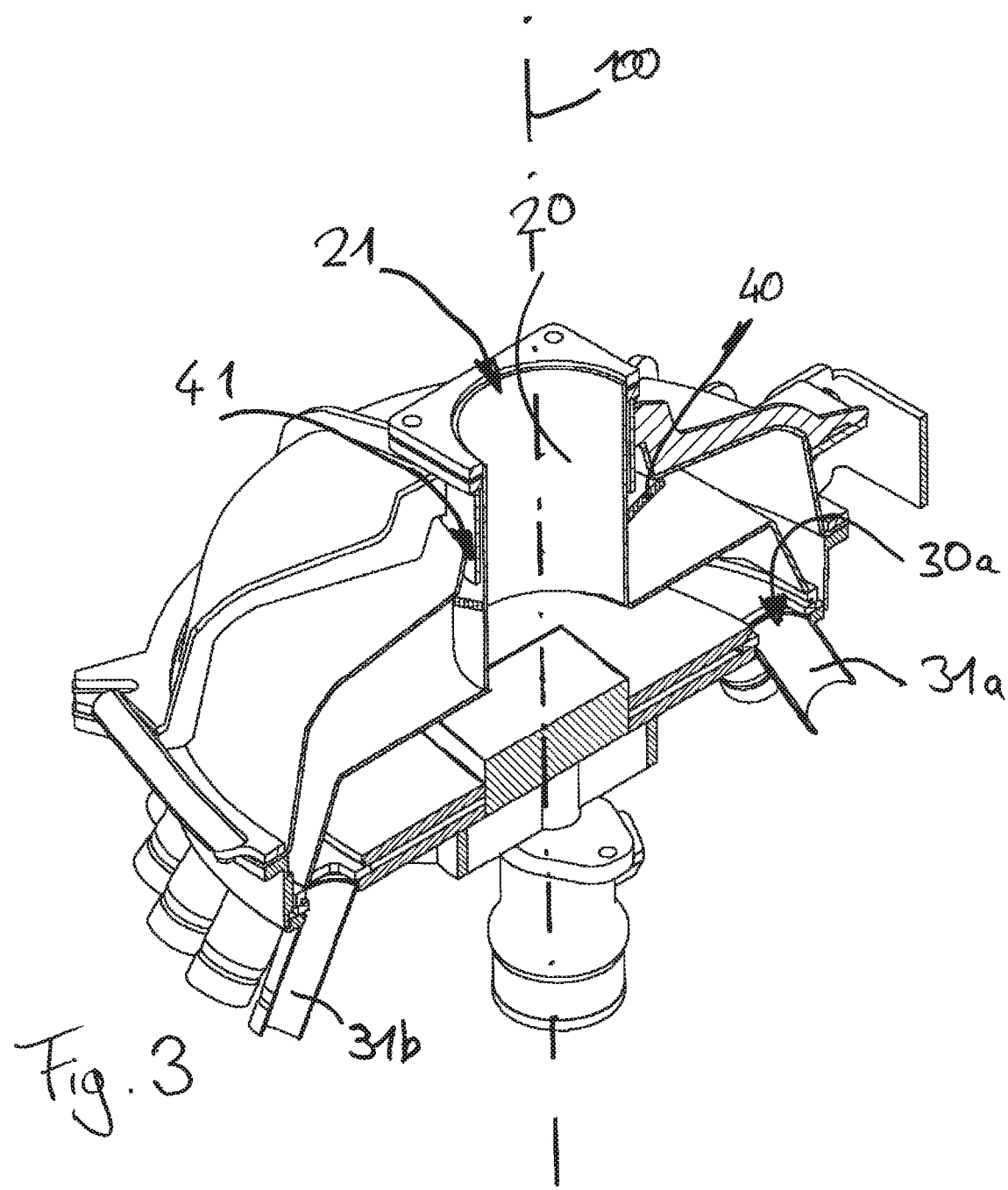
FIG. 3 is a longitudinal cross-sectional perspective view of the embodiment shown in FIG. 1.

The edges of outlet ports 30a, 30b form an upper planar support surface for a cutting screen formed by an annular perforated plate. A triple-winged cutting rotor 50, which rotates about central longitudinal axis 100, can be seen lying on the cutting screen in FIG. 2. Cutting rotor 50 has a total of three rotor wings 55a, 55b, 55c extending radially from a hub 53, and a cutting blade 51 with cutting edges 56a, 56b, 56c formed at the bottom edges of said wings facing the cutting screen. Cutting rotor 50 comprising cutting rotors 55a, 55b, 55c has an inner cavity 32 that is connected to inlet passage 20 and is filled with fluid as a consequence. Said cavity 32 constitutes the fluid space inside the distributor housing.

The hub 53 is made to rotate about the central longitudinal axis by means of a drive motor 54 arranged underneath the housing underside 13. The hub 53 is connected to cutting blade 51 by means of a lower rotor plate 52. This rotational movement results in a shearing effect produced by cutting edges 56a, 56b, 56c interacting with the upper edges 36a, 36b of the openings in the perforated plate, thus resulting in larger solids being efficaciously comminuted/macerated. Simultaneously, each of the outlet ports 30a, 30b is connected by the rotational movement of the cutting rotor 50 alternately to the fluid space 32 formed in the cutting rotor 50 and to ventilation space 42. This results in a pulsating flow of fluid being applied to outlet ports 30a, 30b, with the possibility or more air being drawn from the ventilation space.

Figure 5:
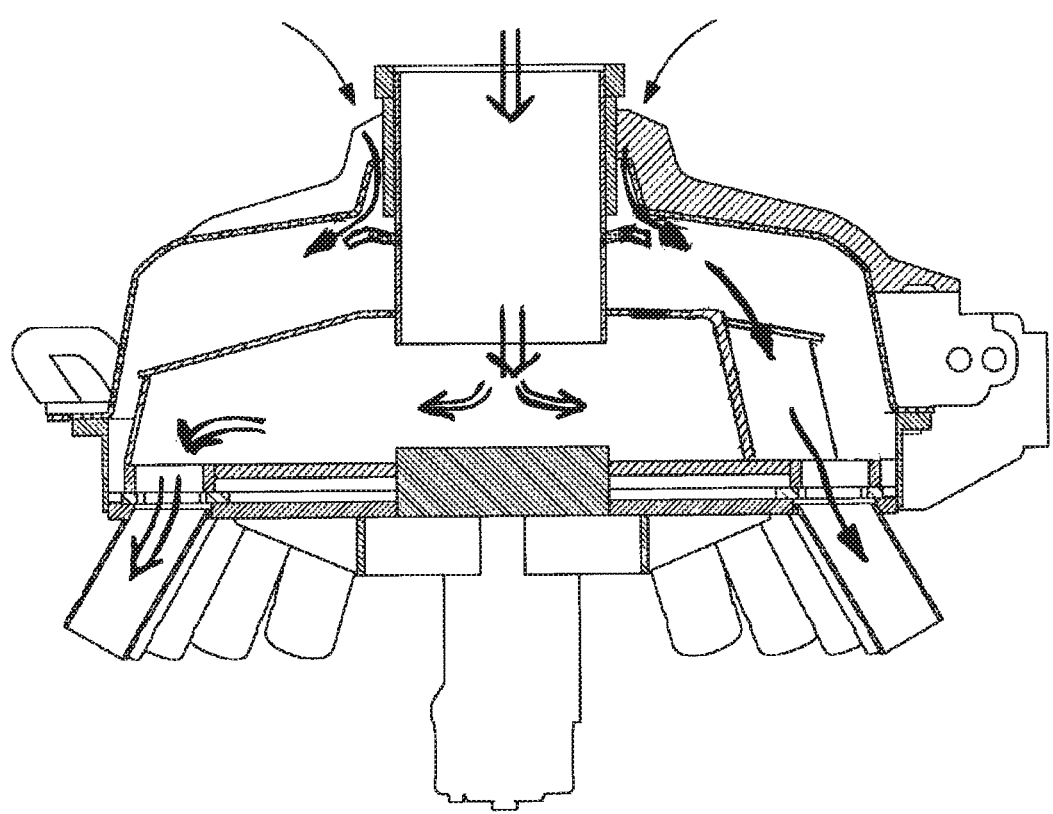

FIG. 5 shows in form of simple arrows how air is guided through the distributor, and in the form of double-headed arrows how fluid is guided. The rotor 50 is shown here in a rotational position in which the fluid is applied to outlet ports 30b on the left-hand housing side and air is applied to the outlet ports 30a on the right-hand housing side.

It will be understood by one having ordinary skill in the art that construction of the described present disclosure and other components is not limited to any specific material. Other exemplary embodiments of the disclosure disclosed herein may be formed from a wide variety of materials, unless described otherwise herein.

For purposes of this disclosure, the term "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that many modifications are possible, e.g., variations in sizes, dimensions, structures, shapes and proportions of the various elements, values of parameters, mounting arrangements, use of materials, colors, orientations, etc. without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure and method without departing from the concepts of the present disclosure, and further it is to be understood that such concepts are intended to be covered by the following claims unless these claims by their language expressly state otherwise.

The invention claimed is:

1. A distributor device for solids-laden fluids comprising:
a distributor housing comprising a housing underside and a housing topside opposite the housing underside which define an interior space that is subdivided into a fluid space into which an inlet port opens and a ventilation space separate therefrom into which a ventilation port opens;
a plurality of outlet ports;
the inlet port in the distributor housing, the inlet port opening into an inlet passage which extends from the housing topside into the fluid space;
the ventilation port disposed in the housing topside of the distributor housing, the ventilation port being formed by an annular passage around the inlet passage into which the inlet port opens; and
a rotor which is movable relative to the distributor housing and disposed inside the distributor housing, and which connects each of the plurality of outlet ports in fluid communication with the fluid space and with the ventilation space in alternating succession;
wherein the relative movement of the rotor connects an outlet port of the plurality of outlet ports alternately with the fluid space and the ventilation space.

2. The distributor device according to claim 1, wherein the outlet ports are arranged in or adjacent to the housing underside.

3. The distributor device according to claim 2, wherein the outlet ports are arranged in a housing side wall connecting the housing underside to the housing topside.

4. The distributor device according to claim 1, wherein no outlet port is arranged in the housing topside.

5. The distributor device according to claim 1, wherein the distributor housing comprises a housing base and a housing cover releasably connected to the housing base, and the housing cover comprising the housing topside and a housing side wall that extends from the housing topside to the housing underside.

6. The distributor device according claim 1, wherein the ventilation port is sealed by a non-return valve adapted to stop fluid escaping from the ventilation space through the ventilation port and to allow air to flow into the ventilation space through the ventilation port.

7. The distributor device according to claim 6, wherein the non-return valve comprises a sealing diaphragm which is elastically biased to a closed position, in which the escape of fluid from the ventilation space through the ventilation port is blocked, and which can be moved by a relative underpressure in the ventilation space relative to the ventilation port into an open position, in which the inflow of air through the ventilation port into the ventilation space is allowed.

8. The distributor device according to claim 7, wherein the sealing diaphragm comprises an elastomeric ring around the inlet passage.

9. The distributor device according to claim 8, wherein the sealing diaphragm comprises an elastomeric annular disc.

10. The distributor device according to claim 1, wherein the ventilation port is arranged proximate a dome-shaped outward bulge in the housing topside.

11. The distributor device according to claim 1, further comprising a sealing member movable between a first position, in which it seals at least one of the plurality of outlet ports against the fluid space, and a second position, in which it provides fluid communication between the at least one of the plurality of outlet ports and the fluid space.

12. The distributor device according to claim 11, wherein the sealing member is adapted to connect each of the outlet ports in alternating succession to the fluid space and to the ventilation space.

13. The distributor device according to claim 1, wherein a comminution/maceration unit formed as moving blades or as a shredder is disposed in the interior space for comminution/maceration of solids in the solids-laden fluid by cutting, shearing, or tearing.

14. The distributor device according to claim 13, wherein the comminution/maceration unit further comprises the rotor.

15. The distributor device according to claim 14, wherein the relative movement of the rotor causes comminution/maceration by the comminution/maceration unit.

16. The distributor device according to claim 11, further comprising a comminution/maceration unit comprising a first cutting element formed by a plurality of upper edges proximate a plurality of openings and a second cutting element integrally formed by a plurality of cutting edges disposed on the rotor, wherein the openings are in fluid communication with the plurality of outlet ports, such that the plurality of cutting edges disposed on the rotor is formed with the sealing member.

* * * * *